United States Patent
Hauleitner et al.

(10) Patent No.: US 12,092,158 B2
(45) Date of Patent: Sep. 17, 2024

(54) TWO-PART BEARING CAGE FOR A ROLLING BEARING

(71) Applicant: AKTIEBOLAGET SKF, Gothenburg (SE)

(72) Inventors: Rudolf Hauleitner, Ann Arbor, MI (US); Alexander Mocnik, Steyr (AT); Hans Wallin, Cape Coral, FL (US)

(73) Assignee: AKTIEBOLAGET SKF, Gothenburg (SE)

( * ) Notice: Subject to any disclaimer, the term of this patent is extended or adjusted under 35 U.S.C. 154(b) by 27 days.

(21) Appl. No.: 18/083,062

(22) Filed: Dec. 16, 2022

(65) Prior Publication Data

US 2024/0167510 A1    May 23, 2024

Related U.S. Application Data

(63) Continuation-in-part of application No. 17/991,102, filed on Nov. 21, 2022, now abandoned.

(51) Int. Cl.
*F16C 19/06* (2006.01)
*F16C 33/38* (2006.01)

(52) U.S. Cl.
CPC .......... *F16C 33/3862* (2013.01); *F16C 19/06* (2013.01); *F16C 2220/04* (2013.01)

(58) Field of Classification Search
CPC .. F16C 19/06; F16C 33/3862; F16C 33/3875; F16C 2220/04; F16C 2220/06
See application file for complete search history.

(56) References Cited

U.S. PATENT DOCUMENTS

| | | | | |
|---|---|---|---|---|
| 4,451,098 A | * | 5/1984 | Farley | F16C 33/3875 384/526 |
| 9,512,880 B2 | * | 12/2016 | Yasuda | F16C 33/3875 |
| 10,247,241 B2 | * | 4/2019 | Taniguchi | F16C 19/06 |
| 2017/0108043 A1 | * | 4/2017 | Mocnik | F16C 33/3875 |
| 2020/0355222 A1 | | 11/2020 | Mocnik | |
| 2021/0262523 A1 | * | 8/2021 | Ince | F16C 33/3862 |

FOREIGN PATENT DOCUMENTS

| | | | | |
|---|---|---|---|---|
| DE | 102012222800 A1 | * | 6/2014 | ......... F16C 33/3875 |
| WO | WO-2011098357 A1 | * | 8/2011 | ......... F16C 33/3875 |
| WO | WO-2021069008 A1 | * | 4/2021 | |
| WO | WO-2021069013 A1 | * | 4/2021 | ......... F16C 33/3875 |

* cited by examiner

*Primary Examiner* — Phillip A Johnson
(74) *Attorney, Agent, or Firm* — J-TEK LAW PLLC; Scott T. Wakeman; Mark A. Ussai

(57) ABSTRACT

A two-part bearing cage for a rolling bearing includes a first cage part and a second cage part. Each cage part includes an annular base body with a plurality of bars extending axially from the annular base body and/or a plurality of complementarily designed bar receptacles. The bars of one cage part engage in the bar receptacles of the other cage part to form cage bars for defining cage pockets configured to receive the rolling elements of the rolling bearing. Each bar includes a claw and each bar receptacle includes a connection portion such that each connection portion and its corresponding claw form a snap joint.

14 Claims, 3 Drawing Sheets

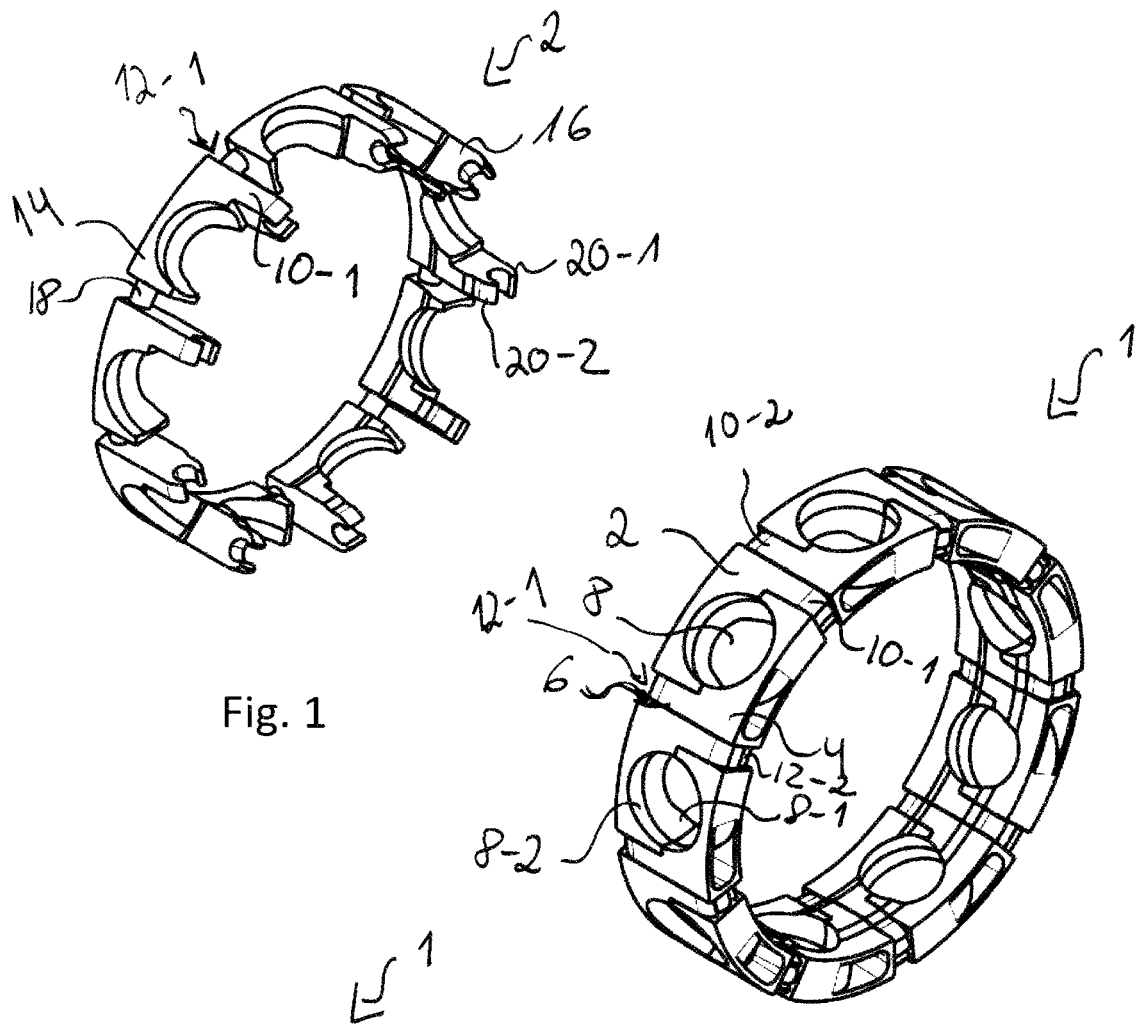
Fig. 1
Fig. 2
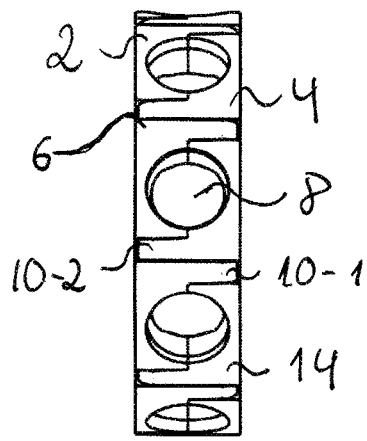
Fig. 3

TWO-PART BEARING CAGE FOR A ROLLING BEARING

CROSS-REFERENCE

This application is a continuation-in-part of U.S. patent application Ser. No. 17/991,102, filed Nov. 21, 2022, now pending, which is incorporated herein by reference.

BACKGROUND OF THE INVENTION

The present invention relates to bearings, and more particularly to cages for rolling element bearings.

In rolling bearings, for example in ball bearings, cages are used to separate the rolling elements at equal distance. There are two basic types of cage designs, one-piece cages and two-piece cages. In bearings where the inner and outer rings cannot be separated after assembly, such as with deep groove ball bearings, one-piece polymer cages are typically designed to be snapped into the bearing. Structurally, such a cage consists of a side ring with attached cantilevered bars which form the pockets for the rolling elements. In order to be able to enter the bearing, the cage bars first deform elastically during insertion, then once in place, snap back and the cage is retained. Such cages are typically inexpensive to both make and to mount in the bearing. A disadvantage is that the cage bars are cantilevered and subjected to centrifugal force during operation. At high speed the bars bend radially outwards. This is known as the "umbrella effect". The bending of the bars can change the pocket geometry and may lead to rubbing of the cage bars against the rolling elements and/or the outer ring. The umbrella effect limits the bearings speed with this cage type.

In a two-piece cage design, the cage is generally composed of identical cage halves, which are connected by retaining elements, typically rivets. This cage type is not affected by centrifugal force and there is no umbrella effect. There are two common cage designs, one is made of stamped steel, the other is made of metal or fiber reinforce phenolic resin and machined. The type of cage which is made from stamped steel is the most common as this is inexpensive to make, and the riveting process can be automated. However, it is also not suitable for high-speed operation. Also, the other cage type, namely the one which is made from metal or machined from fiber reinforced phenolic resin may be suitable for higher speeds, it is expensive to make, and not easy to rivet.

SUMMARY OF THE INVENTION

It is therefore an object of the present invention to provide a two-part bearing cage that is inexpensive to make, easy to assemble in the bearing, not subject to the umbrella effect and also suitable for high rotational speeds.

The present invention provides a two-piece bearing cage for a rolling bearing, particularly for a ball bearing. The bearing cage has a first cage part and a second cage part. Each cage part includes an annular base body with a plurality of bars extending axially from the annular base body and/or a plurality of complementary designed bar receptacles, wherein the bars of one cage part engage in the bar receptacles of the other cage part thereby forming cage bars for defining cage pockets configured to receive the rolling elements of the rolling bearing. Each bar can have a shape that forms one half of the rolling element pocket such that, when the two cage parts are connected, two corresponding bars form one pocket. The first and second cage part can be identical to each other. Alternatively, the first and second cage part can be different from each other.

In order to securely retain the two cage parts even at high rotational speeds, each bar includes a claw, and each bar receptacle includes a connection portion, wherein each connection portion of one cage part is configured to snap into the corresponding claw of the other cage part such that each connection portion and its corresponding claw form a snap joint. The connection portion may be a cylinder of preferably round cross section, but other cross section geometries may also be possible.

After assembly the two cage parts can form a symmetrical cage that is not affected by centrifugal force. This has the advantage that the described cage design allows for operation at high speed which is a requirement for a wide range of applications, in particular for electric vehicles. In particular, the snap joint is configured to fixate or retain the bar in all directions, such that the snap joint can prevent bending of the bars as well as the umbrella effect caused by centrifugal force. Moreover, by using snap joints to connect the two cage parts, the assembly of the bearing cage can be very fast, thus making the assembly process more time efficient. Also, it is possible to inspect the integrity of the snap joints after assembly.

For example, each bar may form one half of the rolling element pocket and may have an extension that extends axially. Preferably, the claw is formed at an axial end of the bar, particularly at the axial end of the extension of the bar. Also, each connection portion may have a cylindrical shape. For example, the connection portion may be formed as a cylinder or cylindrical bar, which is recessed from the base body. This allows the claw to snap around the connection portion, i.e. the cylinder or cylindrical bar, more easily. Furthermore, by providing the claw receptacle as a part of the base body, the snap joint may be disposed close to the annular base body. In other words, there is no snap joint arranged in the middle of the cage bar reducing the risk that the cage bars bend radially outwards. Also, the closer the snap joints are to the base body, particularly to an axial edge of the base body, the easier it may be to inspect the integrity of the snap joints.

According to a preferred embodiment, the claw has a first arm and a second arm, wherein the arms are configured to snap around the connection portion, wherein the first arm and the second arm are disposed such that an end of the first arm and an end of the second arm are spaced apart from each other in the radial direction. In particular, when the two cage parts are pushed against each other, which cause the claw to be pushed against the cylindrical bar or cylinder of the connection portion, the arms of the claw open up and the cylindrical portion snaps into the claw portions. Further, the diameter of the connection portion and the distance between the ends of the first and second arm of the claw portion may be designed such that the claw portion can be snapped around the connection portion, but at the same time the coupling between the claw and the connection portion is strong enough to ensure a stable connection between the two cage parts.

More particularly, the inner sides of the first and second arm that contact the connection portion may have a shape that corresponds to the shape of the connection portion. Preferably, the claw may have an annular shape with an opening when viewed from the circumferential direction. For example, the opening may be provided at the axial end of the bar, wherein opening is limited by the ends of the first and second arm. Moreover, the opening may be dimensioned such that when the connection portion is pushed against the arms of the claw, the arms of the claw are compelled to open and receive the connection portion. In particular, the opening may have an angle that matches the shape of the connection portion. That is, when viewed in the circumferential direction, a line running along an end of the first arm and a line running along an end of the second arm may form an angle, wherein the angle is adapted to a size and/or shape of the connection portion to allow the claw to receive the connection portion. The angle may be between 20° and 40°, preferably between 25° and 35°. For example, the angle may be approximately 30°.

In order to facilitate ejection from a mold, in case that the cage parts are formed by a molding process such as injection molding, a thickness of the end of the first and second arm of the claw may be smaller than at a base of the arm. In other words, each arm may be tapered from the base of the arm to the end of the arm.

Moreover, a cage bar between two cage pockets may be formed by two bars and two bar receptacles that form two snap joints. In other words, there are two bars including their respective claws and two connection portions that form two snap joints between two cage pockets. The snap joints are located on opposite sides of the cage, engaging alternate cage parts or cage halves. The advantages of this design are that two snap joints provide stronger fixation than one and that the cage parts are symmetrical and identical and can be used in cages with both even and odd number of ball pockets. With two snap joints between each cage pocket the strength is greater than with only one joint.

Alternatively, one cage bar between two cage pockets may be formed by one bar and one bar receptacle that form one snap joint. For example, the bars and bar receptacles may be arranged in such a way that the snap joints are located on alternate sides. This may be particularly advantageous for smaller cages or cages where there is too little space available between two cage pockets for two snap joints. If there is an even number of cage pockets, the two cage parts can be identical with snap joints located on alternate sides.

Preferably, first and second cage parts are identical to each other. This allows for a cost and time efficient manufacturing and assembly process. With two identical parts, the cost is lower than with two different parts. Alternatively, the first cage part comprises the bars and the second cage part comprises the bar receptacles.

According to a further embodiment, the cage is manufactured from plastic, in particular from an injection-moldable plastic. Particularly advantageous is a plastic such as PEEK, PA4.6, or PA6.6 that is preferably manufactured with a carbon or glass fiber content of 15% to 30%. Alternatively, the plastic may be unreinforced. More specifically, with fiber reinforcement the material is stronger, but less flexible than without fiber reinforcement. This means that with a fiber reinforced material, the claw may have to be designed with less deflection but may be equally strong as a joint designed with more elasticity but with a lower strength material.

Such plastic cages are easy to manufacture with integral snap joints and also simple to assemble in two-part form. Such a light plastic cage can be used in particular in ball bearings. Due to the use of a plastic cage, high rotational speeds can be achieved, since the plastic cage has a low weight and good friction and wear properties. Moreover, the first and/or second cage parts are injection molded and/or made by an additive manufacturing process. This allows for a cost and time efficient manufacturing process. In addition, if the two cage parts are identical to each other, only one injection mold is required in case the cage parts are manufactured by injection molding. Furthermore, it is possible to use a mold that does not have any moving cores when making the cage parts such that the claws can snap out of the mold. This also reduces the manufacturing costs of the bearing cage by reducing the costs of the mold.

Further preferred embodiments are defined in the dependent claims as well as in the description and the figures. Thereby, elements described or shown in combination with other elements may be present alone or in combination with other elements without departing from the scope of protection.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 1 is a perspective view of a cage part for a two-part bearing cage according to a first embodiment;

FIG. 2 is a perspective view of the assembled two-part bearing cage according to the first embodiment;

FIG. 3 is a top view of the assembled two-part bearing cage according to the first embodiment;

DETAILED DESCRIPTION OF THE INVENTION

Figure 4:
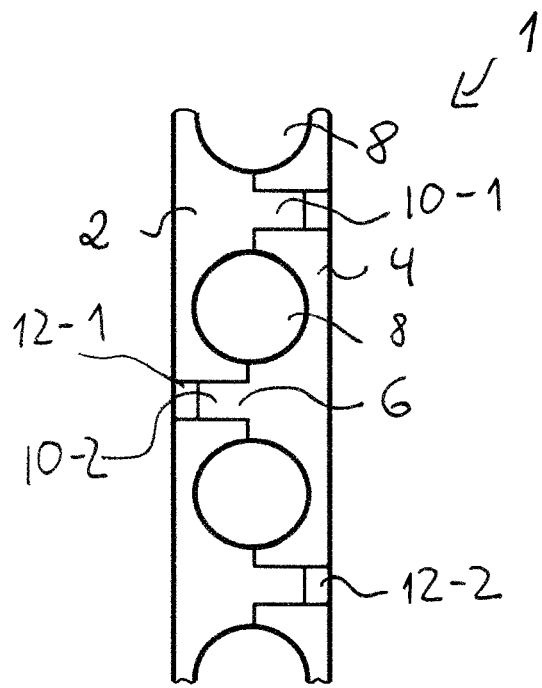
FIG. 4 is a top view of an assembled two-part bearing cage according to a second embodiment.

In the following same or similar functioning elements are indicated with the same reference numerals.

Referring to FIGS. 1 to 3, a two-part bearing cage 1 according to a first embodiment is described. The bearing cage 1 is formed by a first cage part 2 and a second cage part 4. Here the bearing cage parts 2 and 4 are configured identically. As can be further seen from FIGS. 2 and 3, the bearing cage 1 includes cage bars 6 that define cage pockets 8 between them, in which rolling elements (not depicted) are receivable. Here the cage pockets 8 have a toroidal shape; this means that the cage pockets 8 are configured spherical and/or circular on their radially inner side 8-1, while they are configured cylindrical on their radially outer side 8-2. This toroidal design makes it possible that the rolling elements, i.e., the balls, are well guided by the radially inner side 8-1 and are entirely enclosed in the pockets 8, while on their radially outer side 8-2 they have a spacing to the bearing cage 1 such that lubricant can penetrate into the gap between rolling element and bearing cage 1, whereby a particularly good lubrication of the balls is achieved.

Furthermore it can be seen that the cage bars 6 between the cage pockets 8 are formed by bars 10-1, 10-2 engaging into corresponding bar receptacles 12-1, 12-2 of the respective cage parts 2, 4. More particularly, each cage part 2, 4 includes an annular base 14 with a plurality of bars 10 extending axially from the annular base 14 and a plurality of bar receptacles 12. The bars 10 form one half of the cage pocket 8 and each bar has an extension extending axially. The bar receptacles 12 are provided adjacent to each bar 10.

As can be seen from FIG. 1, each bar 10 includes a claw 16 which is formed at an axial end of the bar 10. Each bar receptacle 12 includes a cylinder or cylindrical bar as a connection portion 18, such that each connection portion 18 and its corresponding claw 16 form a snap joint. The cylinder or cylindrical bar of the connection portion 18 is recessed from the base body 14 such that the claw portion 16 can snap around the cylindrical bar or cylinder of the connection portion 18. The connection portion is configured as a part of the base body 14 causing the snap joint to be disposed close to the base body 14. Thus, the cage bar 6 is mostly formed by the bar 10 and the bar extension.

As can be seen from FIG. 1, the claw 16 has a first arm 20-1 and a second arm 20-2 that form the claw and snap around the connection portion or cylinder 18. The first and second arms 20-1, 20-2 are disposed such that an end of the first arm 20-1, and an end of the second arm 20-1 are spaced apart from each other in the radial direction. The inner sides of the first and second arms 20-1, 20-2 that contact the cylinder or cylindrical bar of the connection portion 18 have a spherical or hemispherical shape that corresponds to the diameter of the cylinder or cylindrical bar.

In particular, when the two cage parts 2, 4 are pushed against each other, which causes each claw 16 to be pushed against its corresponding connection portion 18, the arms 20-1, 20-2 open up and the connection portion 18, particularly the cylinder or cylindrical bar, snaps into the arms 20 of claws 16. Thus, the diameter of the cylinder or cylindrical bar of the connection portion 16 and the distance between the ends of the first and second arms 20-1, 20-2 of the claw portion 16 are designed such that the arms 20-1, 20-2 can be easily snapped around the connection portion 18, but at the same time the coupling between the claw 16 and the connection portion 18 is strong enough to ensure a stable connection between the two cage parts 2, 4.

The bearing cage 1 according to the first embodiment as show in FIGS. 1 to 3 has cage bars 6 that are each formed by two bars 10 and two bar receptacles 12. In other words, every cage pocket 8 of each cage part 2, 4 is surrounded by one bar 10-1 on one side and by one bar receptable 12-1 at the other side such that, when the two cage parts 2, 4 are connected, one bar 10-1 of the first cage part 2 and one bar 10-2 of the second cage part 4 of the adjacent cage pocket 8 are arranged next to each other.

FIG. 4 shows a two-part bearing cage 1 according to a second embodiment, which may be particularly advantageous for smaller bearings or cages which do not have enough available space between two cage pockets 8 to have two bars 10 forming the cage bar 6. The two cage parts 2, 4 of the bearing cage 1 according to the second embodiment can be identical to each other in case that the number of cage pockets 8 is even. As can be seen from FIG. 4, the bars 10-1, 10-2 and bar receptacles 12-1, 12-2 are alternately arranged such that every second cage pocket of each cage part 2, 4 is provided with a bar 10 and every other second cage pocket is provided with the bar receptacle 12. Thus, a first cage pocket 8 of the assembled cage is surrounded by one cage bar 6 formed by one bar 10-1 of the first cage part 2 and one bar receptacle 12-2 of the second cage part 4 on one side and one cage bar 6 formed by one bar 10-2 of the second cage part 4 and one bar receptacle 12-1 of the first cage part 2 on the other side.

Figure 5:
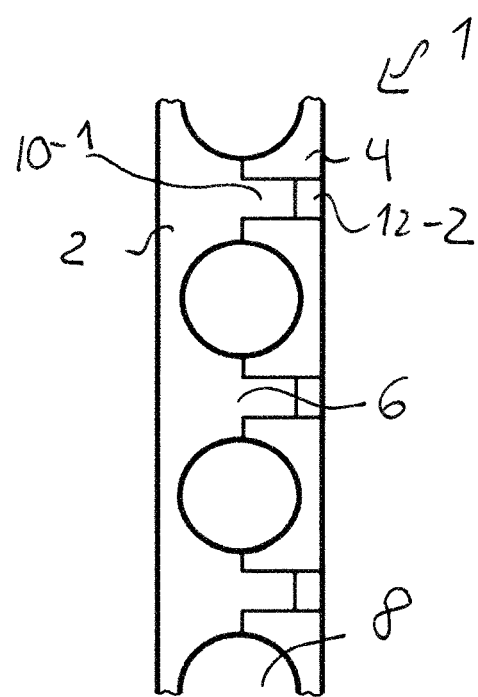
FIG. 5 is a top view of an assembled two-part bearing cage according to a third embodiment.

FIG. 5 shows a two-part bearing cage 1 according to a third embodiment for a rolling bearing having either an odd or even number of rolling elements. The two cage parts 2, 4 of the bearing cage 1 according to the third embodiment are not identical to each other. As can be seen from FIG. 5, the bars 10-1 are provided on the first cage part 2, and the bar receptacles 12-1 are provided on the second cage part 4.

The bearing cage 1 of the first, second, and/or third embodiment is preferably manufactured from plastic, which can be either unreinforced or reinforced, such as PEEK, PA4.6, or PA6.6 and is preferably manufactured with a carbon or glass fiber content of 15% to 30%. Such plastic cages are easy to manufacture and also simple to assemble in two-part form.

Figure 6:
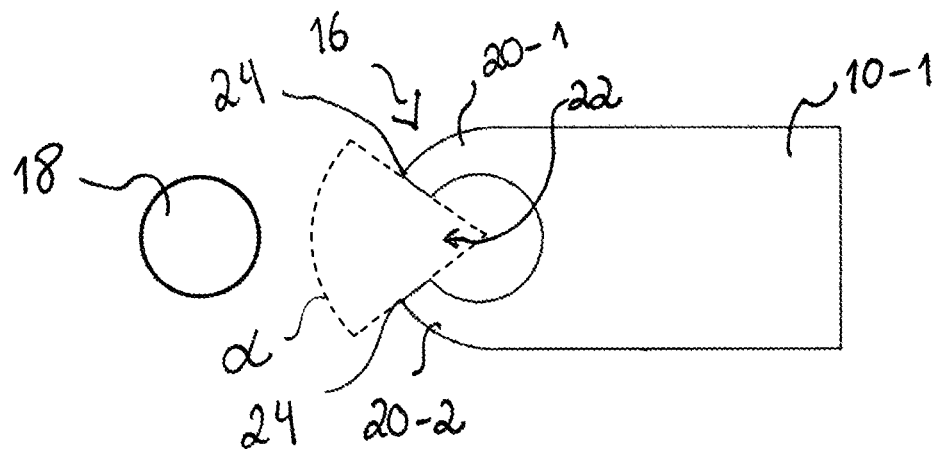
FIGS. 6-8 demonstrate how a first cage part snaps into a second cage part, as viewed in the circumferential direction.
Figure 7:
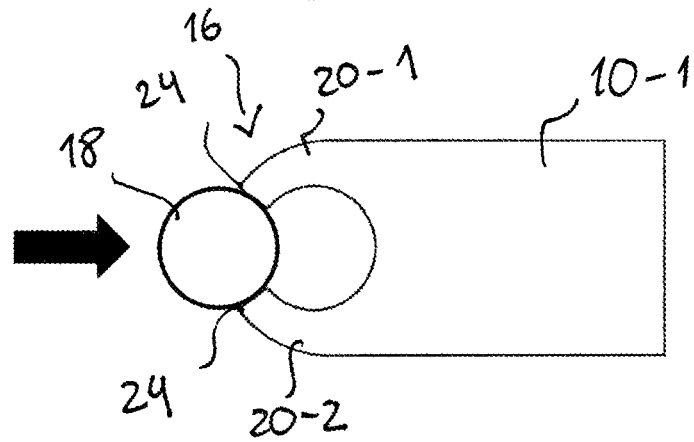
Figure 8:
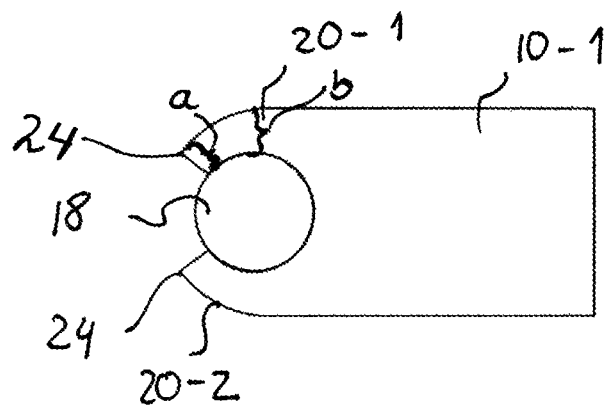

FIGS. 6-8 each show a side view of the bar 10-1 of the first cage part as viewed in the circumferential direction. More particularly, FIGS. 6-8 show how the connection portion 18 of the first cage part snaps into the claw 16 of the second cage part. The arms 20-1, 20-2 of the claw 16 form an annular shape with an opening 22, wherein the opening 22 is arranged at the axial end of the bar 10-1. The opening 22 is limited by the ends 24 of the first and second arm 20-1, 20-2. As can be seen from FIG. 7, the opening 22 is dimensioned such that when the connection portion 18 is pushed against the arms 20-1, 20-2 of the claw 16 (see black arrow), the arms 20-1, 20-2 of the claw 16 are compelled to open and receive the connection portion 18.

In particular, the opening 22 is defined by an angle α that is formed by the ends 24 of the first and second arm 20-1, 20-2 and that is adapted to a size and/or shape of the connection portion 18 to allow the claw to receive the connection portion. In other words, when viewed in the circumferential direction, a line 26 running along the end 24 of the first arm 20-1 and a line 28 running along the end 24 of the second arm 20-2 form the angle α. The angle α may be between 20° and 40°, preferably between 25° and 35°. For example, the angle α may be approximately 30°.

In order to facilitate ejection or release from a mold, in particular when the cage parts are formed by a molding process such as injection molding, a thickness a of the end 24 of the first arm 20-1 and/or the second arm 20-2 of the claw 16 is smaller or less than a thickness b at a base of the first arm 20-1 and/or the second arm 20-2 of the claw 16 (FIG. 8). In other words, a value of a diameter or cross section of each arm 20-1, 20-2 tapers downs from the base of the arm to the end of the arm.

In summary, a two-part bearing cage 1 is disclosed, wherein the cage 1 ensures a secure retention of the two cage parts 2, 4 even at high rotational speeds without experiencing an umbrella effect. For this purpose the bars and the bar receptacles form a snap joint. The described two-part bearing cage 1 is particularly suitable for bearings that are used electric vehicles due to its high rotational speed capability. Furthermore, the cage 1 can be cost efficiently manufactured by injection molding. After assembly, the two cage parts 2, 4 form a symmetrical cage that is not affected by centrifugal force. The snap joints can locate and/or fixate or retain the bar/claw 16, 18 in all directions, providing stability.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

What is claimed is:

1. A two-part bearing cage for a rolling element bearing, the bearing cage comprising:
    a first cage part including an annular base body and a plurality of bars extending axially from the annular base body and/or a plurality of complementarily designed bar receptacles; and
    a second cage part including an annular base body and a plurality of bars extending axially from the annular base body and/or a plurality of complementarily designed bar receptacles;
    wherein the bars of one cage part of the first and second cage parts engage in the bar receptacles of the other cage part of the first and second cage parts to form cage bars for defining cage pockets configured to receive rolling elements of the rolling bearing, each bar including a claw and each bar receptacle including a connection portion, each connection portion of one cage part of the first and second cage parts being configured to snap into a corresponding claw of the other cage part of the first and second cage parts such that the connection portion and the claw form a snap joint;
    wherein each connection portion is formed as a cylindrical bar that is recessed from the base body.

2. The two-part bearing cage according to claim 1, wherein each claw is formed at an axial end of each bar.

3. The two-part bearing cage according to claim 1, wherein each claw has a first arm and a second arm, wherein the first arm and the second arm are configured to snap around the connection portion, the first arm and the second arm being disposed such that an end of the first arm and an end of the second arm are spaced apart from each other in the radial direction.

4. The two-part bearing cage according to claim 3, wherein a thickness of the end of the first and/or second arm is less than a thickness at a base of the first arm and/or the second arm.

5. The two-part bearing cage according to claim 1, wherein the claw has an annular shape with an opening, the opening being limited by an end of the first arm and an end of the second arm and the opening has an angle adapted to a shape and/or size of the connection portion.

6. The two-part bearing cage according to claim 1, wherein each cage bar is formed by two bars and two bar receptacles.

7. The two-part bearing cage according to claim 1, wherein each cage bar is formed by one bar and one bar receptacle.

8. The two-part bearing cage according to claim 7, wherein the bars and the bar receptacles are alternately arranged such that the snap joints are located on alternate sides.

9. The two-part bearing cage according to claim 1, wherein the first and second cage parts are identical to each other.

10. The two-part bearing cage according to claim 1, wherein the first cage part includes the bars and the second cage part includes the bar receptacles.

11. The two-part bearing cage according to claim 1, wherein the first cage part and the second cage part are each manufactured from plastic.

12. The two-part bearing cage according to claim 1, wherein the first cage part and/or the second cage part is injection molded and/or formed by an additive manufacturing method.

13. A two-part bearing cage for a rolling element bearing, the bearing cage comprising:
    a first cage part including an annular base body and a plurality of bars extending axially from the annular base body and/or a plurality of complementarily designed bar receptacles; and
    a second cage part including an annular base body and a plurality of bars extending axially from the annular base body and/or a plurality of complementarily designed bar receptacles;
    wherein the bars of one cage part of the first and second cage parts engage in the bar receptacles of the other cage part of the first and second cage parts to form cage bars for defining cage pockets configured to receive rolling elements of the rolling bearing, each bar including a claw and each bar receptacle including a connection portion, each connection portion of one cage part of the first and second cage parts being configured to snap into a corresponding claw of the other cage part of the first and second cage parts such that the connection portion and the claw form a snap joint; and
    wherein each claw has a first arm and a second arm, wherein the first arm and the second arm are configured to snap around the connection portion, the first arm and the second arm being disposed such that an end of the first arm and an end of the second arm are spaced apart from each other in the radial direction.

14. A two-part bearing cage for a rolling element bearing, the bearing cage comprising:
    a first cage part including an annular base body and a plurality of bars extending axially from the annular base body and/or a plurality of complementarily designed bar receptacles; and
    a second cage part including an annular base body and a plurality of bars extending axially from the annular base body and/or a plurality of complementarily designed bar receptacles;
    wherein the bars of one cage part of the first and second cage parts engage in the bar receptacles of the other cage part of the first and second cage parts to form cage bars for defining cage pockets configured to receive rolling elements of the rolling bearing, each bar including a claw and each bar receptacle including a connection portion, each connection portion of one cage part of the first and second cage parts being configured to snap into a corresponding claw of the other cage part of the first and second cage parts such that the connection portion and the claw form a snap joint; and
    wherein the claw has an annular shape with an opening, the opening being limited by an end of the first arm and an end of the second arm and the opening has an angle adapted to a shape and/or size of the connection portion.

\* \* \* \* \*